US012347392B2

(12) United States Patent
Choi et al.

(10) Patent No.: US 12,347,392 B2
(45) Date of Patent: Jul. 1, 2025

(54) DISPLAY DEVICE AND A METHOD OF DRIVING THE SAME WITH PIXEL COMPENSATION USING ESTIMATED AND ACTUAL DEGRADATION

(71) Applicant: LG Display Co., Ltd., Seoul (KR)

(72) Inventors: JinTaek Choi, Paju-si (KR); Hyojung Park, Paju-si (KR); Seongmin Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 52 days.

(21) Appl. No.: 17/460,080

(22) Filed: Aug. 27, 2021

(65) Prior Publication Data

US 2022/0122548 A1 Apr. 21, 2022

(30) Foreign Application Priority Data

Oct. 16, 2020 (KR) ........................ 10-2020-0134194

(51) Int. Cl.
*G09G 3/3275* (2016.01)

(52) U.S. Cl.
CPC ... *G09G 3/3275* (2013.01); *G09G 2300/0842* (2013.01); *G09G 2320/0295* (2013.01); *G09G 2320/045* (2013.01); *G09G 2320/0693* (2013.01); *G09G 2330/10* (2013.01)

(58) Field of Classification Search
CPC ....... G09G 3/30–3291; G09G 2310/08; G09G 2320/0233; G09G 2320/029–048; G09G 2320/0693; G09G 2330/10; G09G 2340/16; G09G 2360/16
See application file for complete search history.

(56) References Cited

U.S. PATENT DOCUMENTS 8,922,595 B2 12/2014 Ahn et al.
9,349,317 B2 5/2016 Kim et al.
9,715,848 B2 7/2017 Kim et al.
10,629,118 B2 4/2020 Choi et al.
(Continued)

FOREIGN PATENT DOCUMENTS

CN 103871364 A 6/2014
CN 103903560 A 7/2014
(Continued)

OTHER PUBLICATIONS

China National Intellectual Property Administration, Notice of Allowance, Chinese Patent Application No. 202111172558.4, Jan. 4, 2024, 12 pages.
(Continued)

*Primary Examiner* — Keith L Crawley
(74) *Attorney, Agent, or Firm* — Fenwick & West LLP

(57) ABSTRACT

Embodiments of the disclosure relate to a controller and a display device. As the display device is driven, the stress value is accumulated, and a compensation value based on the accumulated stress value is applied upon driving the display. Thus, it is possible to compensate for degradation of subpixels in real time. Further, the amount of degradation of the subpixel is sensed at a preset time, and the stress value is corrected based on the degradation amount sensing data. Thus, it is possible to enhance the accuracy of real-time compensation for degradation of subpixels while minimizing sensing of degradation of subpixels.

17 Claims, 11 Drawing Sheets

(56) References Cited

U.S. PATENT DOCUMENTS

| | | | | |
|---|---|---|---|---|
| 10,720,100 | B2 | 7/2020 | Lee et al. | |
| 10,885,855 | B2 | 1/2021 | Park | |
| 10,964,274 | B2 | 3/2021 | Kang | |
| 11,238,787 | B2 | 2/2022 | An | |
| 11,663,966 | B2 | 5/2023 | In | |
| 2012/0212516 | A1 | 8/2012 | Ahn et al. | |
| 2014/0168039 | A1 | 6/2014 | Kim et al. | |
| 2014/0176409 | A1* | 6/2014 | Kim | G09G 3/3233 345/92 |
| 2016/0133172 | A1* | 5/2016 | Hwang | G09G 3/3233 324/762.07 |
| 2016/0171934 | A1* | 6/2016 | Yang | G09G 3/3258 345/212 |
| 2017/0206836 | A1* | 7/2017 | Kim | G09G 3/3233 |
| 2018/0151117 | A1 | 5/2018 | Choi et al. | |
| 2018/0151119 | A1* | 5/2018 | Lee | G09G 3/3291 |
| 2019/0221158 | A1 | 7/2019 | An | |
| 2020/0043419 | A1 | 2/2020 | Park | |
| 2020/0152135 | A1 | 5/2020 | Kang | |
| 2020/0265779 | A1 | 8/2020 | In | |
| 2020/0372859 | A1* | 11/2020 | Kim | G09G 3/3225 |
| 2020/0372861 | A1* | 11/2020 | Ok | G09G 3/3233 |
| 2021/0125567 | A1 | 4/2021 | Park | |
| 2021/0150950 | A1* | 5/2021 | Lin | G09G 3/3406 |
| 2022/0013049 | A1* | 1/2022 | Pyun | G09G 3/3233 |

FOREIGN PATENT DOCUMENTS

| | | | |
|---|---|---|---|
| CN | 108122532 | A | 6/2018 |
| CN | 110047433 | A | 7/2019 |
| CN | 110796986 | A | 2/2020 |
| CN | 111179844 | A | 5/2020 |
| CN | 111599310 | A | 8/2020 |
| DE | 102017127652 | A1 | 5/2018 |
| KR | 10-2008-0060890 | A | 7/2008 |
| KR | 10-2012-0094736 | A | 8/2012 |
| KR | 10-2014-0079690 | A | 6/2014 |
| KR | 10-2014-0091095 | A | 7/2014 |
| KR | 10-2017-0072407 | A | 6/2017 |
| KR | 10-2018-0059604 | A | 6/2018 |
| KR | 10-2019-0030534 | A | 3/2019 |

OTHER PUBLICATIONS

Korean Intellectual Property Office, Office Action, Korean Patent Application No. 10-2020-0134194, Mar. 21, 2024, 12 pages.

Korean Intellectual Property Office, Office Action, Korean Patent Application No. 10-2020-0134194, Nov. 11, 2024, eight pages, (with concise explanation of relevance).

The German Patent and Trade Mark Office, Office Action, German Patent Application No. 102021126303.4, Dec. 16, 2024, 10 pages.

* cited by examiner

DISPLAY DEVICE AND A METHOD OF DRIVING THE SAME WITH PIXEL COMPENSATION USING ESTIMATED AND ACTUAL DEGRADATION

CROSS-REFERENCE TO RELATED APPLICATION

This application claims priority from Korean Patent Application No. 10-2020-0134194, filed on Oct. 16, 2020, which is hereby incorporated by reference for all purposes as if fully set forth herein.

BACKGROUND

Field

Embodiments of the disclosure relate to a controller and a display device.

Description of Related Art

The growth of the information society leads to increased demand for image display devices and use of various types of display devices, such as liquid crystal displays, organic light emitting displays, etc.

A display device may include a display panel with multiple subpixels and various driving circuits for driving the subpixels. Further, at least one circuit element may be disposed in each of the plurality of subpixels.

As the driving time of the display device increases, circuit elements disposed in the subpixels may degrade. The degree of degradation may differ for the circuit element in each of different subpixels.

Such a difference in the degree of degradation may cause a driving deviation between the subpixels, with the result of poor display quality.

Therefore, a need exists for a method for preventing degradation of circuit elements in subpixels and deterioration of display quality due to a degradation deviation between the circuit elements in different subpixels.

SUMMARY

According to embodiments of the disclosure, there is provided a method for real-time compensation for degradation of circuit elements in subpixels due to an increase in the driving time of a display device.

According to embodiments of the disclosure, there is provided a method for real-time compensation for degradation of circuit elements in subpixels and correction of errors in the data for compensating for degradation of circuit elements.

According to an embodiment of the disclosure, there is provided a display device, comprising a plurality of subpixels, a data driving circuit supplying a data voltage to the plurality of subpixels, a controller outputting a driving data signal to the data driving circuit, and a memory located inside or outside the controller and storing a stress value indicating the amount of degradation of the plurality of subpixels.

In the display device, if the controller outputs the driving data signal, the stress value stored in the memory may be increased, and if the amount of degradation of at least one of the plurality of subpixels is sensed at a preset time, the stress value stored in the memory may be calibrated.

The stress value stored in the memory may be increased or decreased if the amount of degradation of at least one of the plurality of subpixels is sensed.

If the stress value stored in the memory increases, the increase in the stress value may be larger or smaller than the stress value when the controller outputs the driving data signal.

According to an embodiment of the disclosure, there is provided a display device, comprising a plurality of subpixels, a data driving circuit supplying a data voltage to the plurality of subpixels, a controller outputting a driving data signal to the data driving circuit and receiving degradation amount sensing data from the data driving circuit at a preset time, and a memory storing a stress value, wherein the stress value is increased if the controller outputs the driving data signal, and the stress value is calibrated if the controller receives the degradation amount sensing data.

According to an embodiment of the disclosure, there is provided a controller, comprising a data signal output unit outputting a driving data signal to a data driving circuit and a memory storing a stress value that is increased if the data signal output unit outputs the driving data signal.

The stress value stored in the memory may be increased or decreased if the controller receives degradation amount sensing data from the data driving circuit.

According to embodiments of the disclosure, it is possible to compensate for degradation of circuit elements in subpixels in real time by accumulating the stress value of the circuit element in the subpixel according to the driving time of the display device and applying a compensation value corresponding to the stress value.

According to embodiments of the disclosure, it is possible to sense the amount of degradation of the circuit element in the subpixel at a preset time and calibrate the accumulated stress value according to the sensed data. It is thus possible to correct errors that may occur during real-time compensation for degradation of circuit elements and enhance the accuracy of compensation for circuit element degradation.

According to other embodiments, a display device comprises a plurality of subpixels; a data driving circuit providing data voltages to the subpixels; and a controller outputting driving data signals to the data driving circuit, wherein: during a first period, the controller causes the data driving circuit to drive a first subpixel with a first data voltage that is compensated according to a first stress value indicative of estimated degradation of the first subpixel, the first stress value adjusted based on a first initial stress value and the data voltages driving the first subpixel; during a second period subsequent to the first period, the controller receives from the data driving circuit first degradation amount sensing data indicative of sensed actual degradation of the first subpixel and initializes the first stress value to a second initial stress value according to the first degradation amount sensing data of the first subpixel; and during a third period subsequent to the second period, the controller causes the data driving circuit to drive the first subpixel with a second data voltage that is compensated according to a second stress value indicative of estimated degradation of the first subpixel, the second stress value adjusted based on the second initial stress value and the data voltages driving the first subpixel.

The first stress value and the second stress value increase during the first period and the third period, respectively, as the first subpixel is driven by the data voltages. Actual degradation of the first subpixel is not sensed during the first period and the third period. Actual degradation of the first subpixel is sensed during the second period, responsive to the first stress value being equal to or greater than a predetermined stress value. In some embodiments, actual degradation of the first subpixel is sensed, responsive to an amount of increase of the first stress value being equal to or greater than a predetermined stress value. In some embodiments, actual degradation of the first subpixel is sensed, responsive to the first subpixel being driven equal to or longer than a predetermined driving time. In some embodiments, actual degradation of the first subpixel is sensed, at periodic intervals.

In some embodiments, the second initial stress value is greater than the first stress value. In some embodiments, the second initial stress value is smaller than the first stress value.

In some embodiments, during the first period, the controller causes the data driving circuit to drive a second subpixel with a third data voltage that is compensated according to a third stress value indicative of estimated degradation of the second subpixel, the third stress value adjusted based on a third initial stress value and the data voltages driving the second subpixel; during the second period, the controller receives from the data driving circuit second degradation amount sensing data indicative of sensed actual degradation of the second subpixel and initializes the third stress value to a fourth initial stress value according to the second degradation amount sensing data of the second subpixel, the fourth initial stress value being different from the second initial stress value; and during the third period, the controller causes the data driving circuit to drive the second subpixel with a fourth data voltage that is compensated according to a fourth stress value indicative of estimated degradation of the second subpixel, the fourth stress value adjusted based on the fourth initial stress value and the data voltages driving the second subpixel.

The display device may further comprise a memory, wherein the first stress value, a first compensation value corresponding to the first stress value, the second stress value, a second compensation value corresponding to the second stress value are stored in the memory.

Degradation of the first subpixel may include degradation of at least one of a light emitting element and a driving transistor included in the first subpixel.

In still other embodiments, a method of driving a display device including a plurality of subpixels comprises: during a first period, driving a first subpixel with a first data voltage that is compensated according to a first stress value indicative of estimated degradation of the first subpixel, the first stress value adjusted based on a first initial stress value and data voltages driving the first subpixel; during a second period subsequent to the first period, sensing actual degradation of the first subpixel and initializing the first stress value to a second initial stress value according to the sensed actual degradation of the first subpixel; and during a third period subsequent to the second period, driving the first subpixel with a second data voltage that is compensated according to a second stress value indicative of estimated degradation of the first subpixel, the second stress value adjusted based on the second initial stress value and the data voltages driving the first subpixel.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
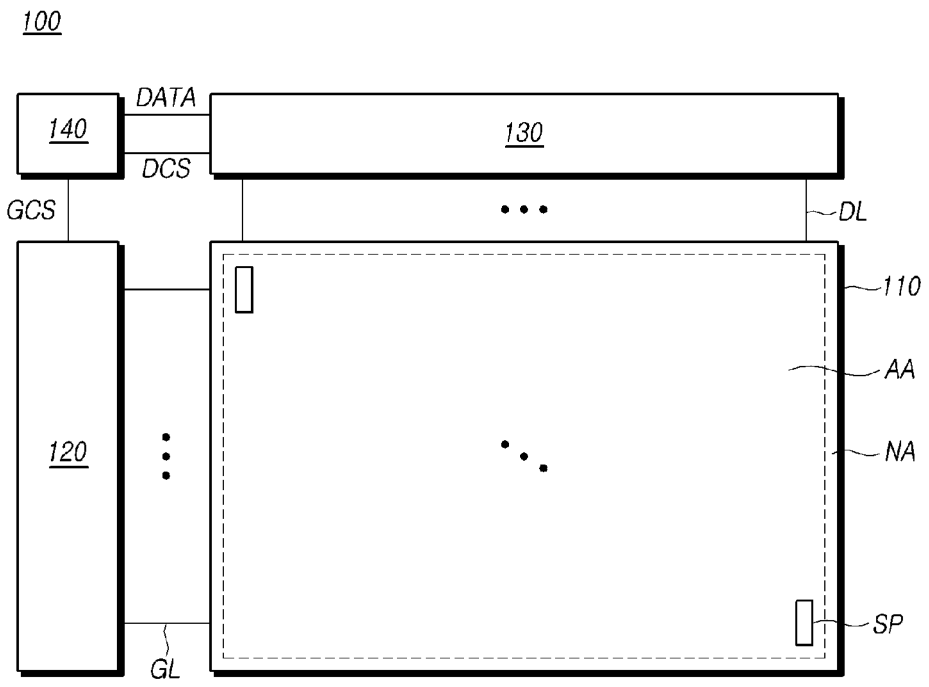
FIG. 1 is a view schematically illustrating a configuration of a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

FIG. 1 is a view schematically illustrating a configuration of a display device 100 according to various embodiments of the disclosure.

Referring to FIG. 1, a display device 100 may include a display panel 110 and a gate driving circuit 120, a data driving circuit 130, and a controller 140 for driving the display panel 110.

The display panel 110 may include an active area AA in which a plurality of subpixels SP are disposed and a non-active area NA positioned outside the active area AA.

The display panel 110 may include a plurality of gate lines GL, a plurality of data lines DL, and subpixels SP at the crossings of the gate lines GL and the data lines DL.

The gate driving circuit 120 may be controlled by the controller 140 to sequentially output scan signals to the plurality of gate lines GL disposed in the display panel 110, controlling the driving timing of the subpixels SP.

The gate driving circuit 120 may include one or more gate driver integrated circuits (GDICs). Depending on driving schemes, the gate driving circuit 120 may be positioned on only one side, or each of two opposite sides, of the display panel 110.

Each gate driver integrated circuit (GDIC) may be connected to the bonding pad of the display panel 110 in a tape automated bonding (TAB) or chip-on-glass (COG) scheme or may be implemented in a gate-in-panel (GIP) type to be directly disposed in the display panel 110 or, in some cases, may be integrated in the display panel 110. Each gate driver integrated circuit (GDIC) may also be implemented in a chip-on-film (COF) scheme to be mounted on a film connected to the display panel 110.

The data driving circuit 130 receives image data from the controller 140 and converts the image data into an analog data voltage Vdata. The data driving circuit 130 outputs the data voltage Vdata to each data line DL according to the timing of a scan signal applied via the gate line GL, allowing each subpixel SP to represent a brightness according to the image data.

The data driving circuit 130 may include one or more source driver integrated circuits (SDICs).

Each source driver integrated circuit (SDIC) may include, e.g., shift registers, latch circuits, digital-analog converters, and output buffers.

Each source driver integrated circuit (SDIC) may be connected to the bonding pad of the display panel 110 in a TAB or COG scheme or may be directly disposed in the display panel 110 or, in some cases, may be integrated in the display panel 110. Each source driver integrated circuit (SDIC) may be implemented in a COF scheme in which case each source driver integrated circuit (SDIC) may be mounted on a film connected to the display panel 110 and be electrically connected with the display panel 110 via wires on the film.

The controller 140 supplies various control signals to the gate driving circuit 120 and the data driving circuit 130 and controls the operation of the gate driving circuit 120 and the data driving circuit 130.

The controller 140 may be mounted on a printed circuit board or a flexible printed circuit and may be electrically connected with the gate driving circuit 120 and the data driving circuit 130 through the printed circuit board or the flexible printed circuit.

The controller 140 enables the gate driving circuit 120 to output scan signals according to the timing of each frame, converts image data received from the outside to meet the data signal format used by the data driving circuit 130, and outputs the resultant image data to the data driving circuit 130.

The controller 140 receives, from the outside (e.g., a host system), various timing signals including a vertical synchronization signal VSYNC, a horizontal synchronization signal HSYNC, an input data enable signal DE, and a clock signal, along with the image data.

The controller 140 may generate a variety of control signals using the timing signals received from the outside and output the control signals to the gate driving circuit 120 and the data driving circuit 130.

As an example, to control the gate driving circuit 120, the controller 140 outputs various gate control signals GCS including a gate start pulse GSP, a gate shift clock GSC, and a gate output enable signal GOE.

The gate start pulse GSP controls the operation start timing of one or more gate driver integrated circuits GDICs constituting the gate driving circuit 120. The gate shift clock GSC is a clock signal commonly input to one or more gate driver integrated circuits GDICs and controls the shift timing of the scan signals. The gate output enable signal GOE designates timing information about one or more gate driver integrated circuits GDICs.

To control the data driving circuit 130, the controller 140 outputs various data control signals DCS including, e.g., a source start pulse SSP, a source sampling clock SSC, and a source output enable signal SOE.

The source start pulse SSP controls the data sampling start timing of one or more source driver integrated circuits SDICs constituting the data driving circuit 130. The source sampling clock SSC is a clock signal for controlling the sampling timing of data in each source driver integrated circuit (SDIC). The source output enable signal SOE controls the output timing of the data driving circuit 130.

The display device 100 may further include a power management integrated circuit that supplies various voltages or currents to, e.g., the display panel 110, the gate driving circuit 120, and the data driving circuit 130 or controls various voltages or currents to be supplied.

Each subpixel SP may be an area defined by the intersection of the gate line GL and the data line DL, and at least one circuit element including a light emitting element may be disposed therein.

For example, if the display device 100 is an organic light emitting display device, organic light emitting diodes (OLEDs) and several circuit elements may be disposed in the plurality of subpixels SP. Each subpixel SP may display a brightness corresponding to image data by controlling the current supplied to the OLED disposed in the subpixel SP by several circuit elements.

In some cases, a light emitting diode (LED) or micro light emitting diode (μLED) may be disposed in each subpixel SP.

Figure 2:
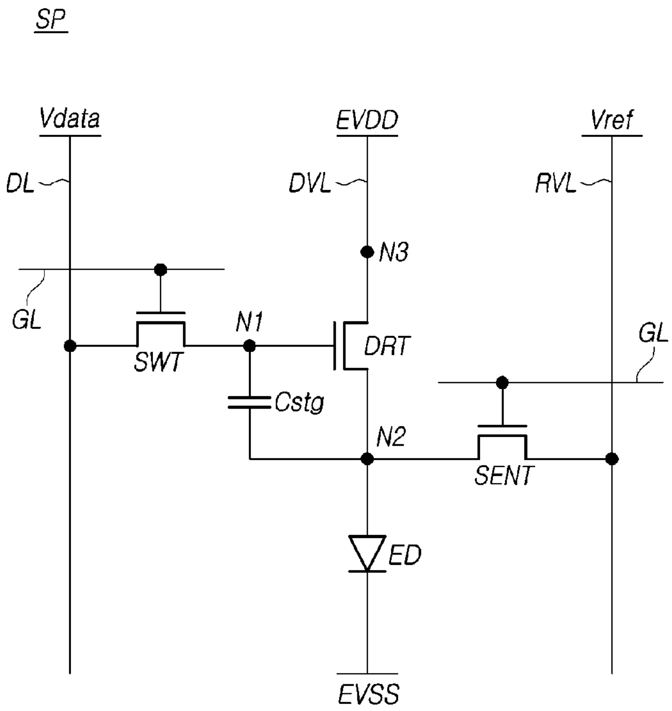
FIG. 2 is a view illustrating an example circuit structure of a subpixel included in a display device according to embodiments of the disclosure.

FIG. 2 is a view illustrating an example circuit structure of a subpixel SP included in a display device 100 according to embodiments of the disclosure.

Referring to FIG. 2, a light emitting element ED and a driving transistor DRT for driving the light emitting element ED may be disposed in a subpixel SP. In addition to the light emitting element ED and the driving transistor DRT, at least one circuit element may be disposed in the subpixel SP.

As an example, as illustrated in FIG. 2, a switching transistor SWT, a sensing transistor SENT, and a storage capacitor Cstg may be further disposed in the subpixel SP.

Although FIG. 2 illustrates a 3T1C structure in which three thin film transistors and one capacitor are disposed in the subpixel SP in addition to the light emitting element ED as an example, embodiments of the disclosure are not limited thereto. Further, although in the example illustrated in FIG. 2, all of the thin film transistors are of N-type, the thin film transistors disposed in the subpixel SP may be of P-type in some cases.

The switching transistor SWT may be electrically connected between a data line DL and a first node N1. A data voltage Vdata may be supplied to the subpixel SP through the data line DL. The first node N1 may be a gate node of the driving transistor DRT.

The switching transistor SWT may be controlled by a scan signal supplied to the gate line GL. The switching transistor SWT may control application of the data voltage Vdata, which is supplied through the data line DL, to the gate node of the driving transistor DRT.

The driving transistor DRT may be electrically connected between a driving voltage line DVL and the light emitting element ED. A first driving voltage EVDD may be supplied to a third node N3 of the driving transistor DRT through a driving voltage line DVL. The first driving voltage EVDD may be a high potential driving voltage. The third node N3 may be a drain node or source node of the driving transistor DRT.

The driving transistor DRT may be controlled by a voltage applied to the first node N1. The driving transistor DRT may control the driving current supplied to the light emitting element ED.

The sensing transistor SENT may be electrically connected between a reference voltage line RVL and a second node N2. A reference voltage Vref may be supplied to the second node N2 through the reference voltage line RVL. The second node N2 may be a source node or drain node of the driving transistor DRT.

The sensing transistor SENT may be controlled by a scan signal supplied to the gate line GL. The gate line GL controlling the sensing transistor SENT may be the same as, or different from, the gate line GL controlling the switching transistor SWT. The sensing transistor SENT may be controlled to apply the reference voltage Vref to the second node N2. In some cases, the sensing transistor SENT may be controlled to sense the voltage of the second node N2 through the reference voltage line RVL.

The storage capacitor Cstg may be electrically connected between the first node N1 and the second node N2. The storage capacitor Cstg may maintain the data voltage Vdata applied to the first node N1 for one frame.

The light emitting element ED may be electrically connected between the second node N2 and a line to which a second driving voltage EVSS is supplied. The second driving voltage EVSS may be a low potential driving voltage.

The light emitting element ED may display a brightness according to the driving current supplied through the driving transistor DRT.

Therefore, in order for the subpixel SP to display a brightness according to image data, accurate control of the driving transistor DRT and the light emitting element ED is required. However, as the driving time increases, a characteristic value of the driving transistor DRT or the light emitting element ED may be changed due to degradation.

For example, the threshold voltage or mobility of the driving transistor DRT may change over time and use. The threshold voltage of the light emitting element ED may change over time and use as well.

Due to variations in the characteristic value of the driving transistor DRT or the light emitting element ED, a deviation in characteristic value may occur between the subpixels SP. The deviation in characteristic value between the subpixels SP may affect the quality of the image displayed through the display panel 110.

Embodiments of the disclosure provide a method for preventing deterioration of display quality due to degradation of circuit elements disposed in the subpixel SP.

In the disclosure, the amount of variation in the characteristic value of the subpixel SP may mean the amount of degradation of the subpixel SP. The amount of degradation of the subpixel SP may mean the amount of variation in the characteristic value of at least one of the driving transistor DRT and the light emitting element ED disposed in the subpixel SP.

Figure 3:
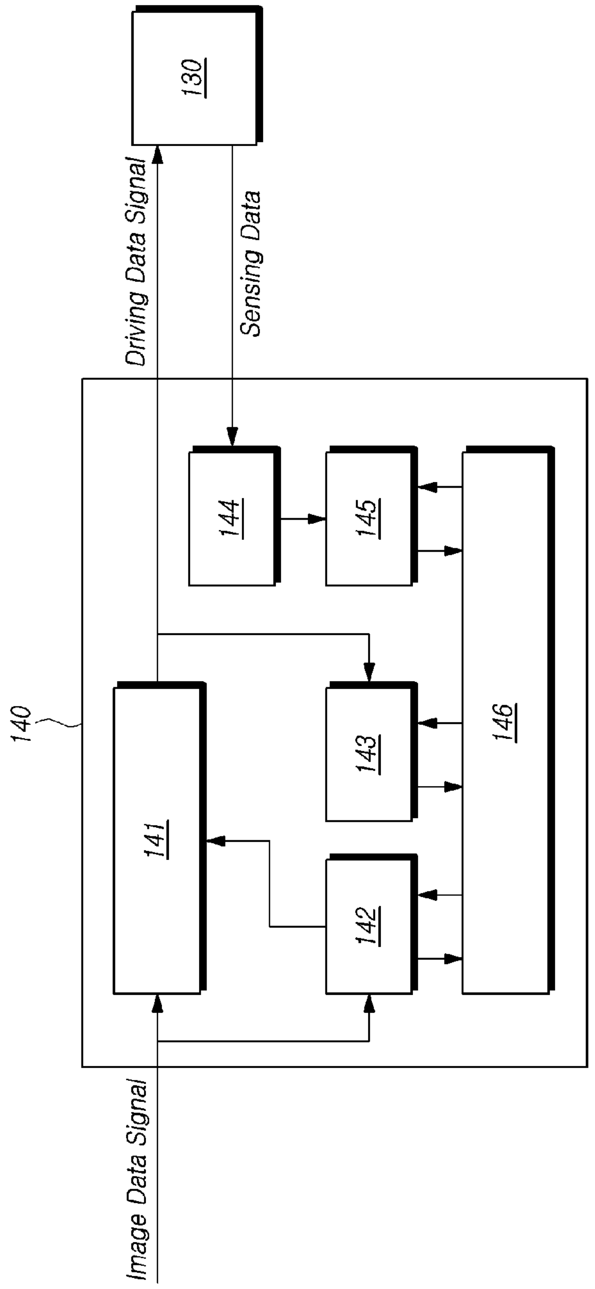
FIG. 3 is a view schematically illustrating a configuration of a controller included in a display device according to embodiments of the disclosure.

FIG. 3 is a view schematically illustrating a configuration of a controller 140 included in a display device 100 according to embodiments of the disclosure.

Referring to FIG. 3, a controller 140 may include a data signal output unit 141 that receives an image data signal from the outside and outputs a driving data signal to a data driving circuit 130.

In addition to the data signal output unit 141, the controller 140 may further include at least one of a compensation unit 142, an accumulation unit 143, a sensing driving unit 144, a correction unit 145, and a memory 146.

For example, the controller 140 may include a data signal output unit 141, a compensation unit 142, an accumulation unit 143, and a memory 146. Alternatively, the controller 140 may include a sensing driving unit 144 and a correction unit 145 in addition to the above-described components. The memory 146 may be disposed inside or outside the controller 140.

The data signal output unit 141 may receive a digital image data signal from the outside. The data signal output unit 141 may output a digital driving data signal to the data driving circuit 130 based on the image data signal.

The driving data signal may be a signal representing the same data as the image data signal. Alternatively, the driving data signal may be a signal representing data obtained by applying a compensation value Vcomp to the image data signal.

Here, the compensation value Vcomp is a value for compensating for degradation of the subpixel SP. The driving data signal obtained by applying the compensation value Vcomp to the image data signal may be output to the data driving circuit 130.

The data driving circuit 130 may generate an analog data voltage Vdata according to the compensation value (Vcomp)-applied driving data signal and supply it to the subpixel SP. As the compensation value (Vcomp)-applied data voltage Vdata is supplied to the subpixel SP, the degradation of the subpixel SP may be compensated.

The compensation value Vcomp may be a value stored in the memory 146. The compensation value Vcomp may be a value corresponding to a stress value Vstr stored in the memory.

The stress value Vstr may be a value indicating the amount of degradation of the subpixel SP. The stress value Vstr may be a value that is accumulated and increased according to the driving of the display device 100.

For example, when the data signal output unit 141 outputs the driving data signal, the accumulation unit 143 may update the stress value Vstr stored in the memory 146.

The data voltage Vdata according to the driving data signal is supplied to the subpixel SP, and degradation of the subpixel SP may proceed according to the data voltage Vdata supplied to the subpixel SP. Thus, the stress value Vstr indicating the amount of degradation of the subpixel SP may be updated based on the driving data signal.

When receiving the image data signal, the compensation unit 142 may identify, from the memory 146, the stress value Vstr of the subpixel SP to be driven according to the image data signal. The compensation unit 142 may also identify the compensation value Vcomp corresponding to the stress value Vstr, from the memory 146.

For example, the memory 146 may store the stress value Vstr indicating the amount of degradation of the subpixel SP. The memory 146 may store a lookup table LUT indicating a correspondence between the stress value Vstr and the compensation value Vcomp.

Accordingly, the compensation unit 142 may identify the compensation value Vcomp corresponding to the stress value Vstr stored in the memory 146, corresponding to the subpixel SP to be driven, and transmit the identified compensation value Vcomp to the data signal output unit 141.

The data signal output unit 141 may output the driving data signal, based on the image data signal received from the outside and the compensation value Vcomp received from the compensation unit 142, to the data driving circuit 130.

As the accumulation unit 143 updates the stress value Vstr according to the driving data signal, and the compensation unit 142 transmits the compensation value Vcomp based on the updated stress value Vstr to the data signal output unit 141, compensation for the degradation of the subpixel SP may be performed in real time.

Accordingly, it is possible to perform real-time compensation based on the driving data signal output by the controller 140 without separately driving for compensation for degradation of the subpixel SP in the display panel 110. Such real-time compensation may prevent deterioration of display quality due to degradation of the subpixel SP.

According to embodiments of the disclosure, the amount of degradation of the subpixel SP may be sensed at a preset time, and the stress value Vstr stored in the memory 146 may be calibrated. Accordingly, it is possible to correct an error in the compensation value Vcomp that may occur when compensation based on the stress value Vstr accumulated according to the driving data signal is performed for a long period of time.

For example, the sensing driving unit 144 of the controller 140 may control driving for sensing the amount of degradation of the subpixel SP at a preset time. The amount of degradation of the subpixel SP may be sensed, e.g., by the data driving circuit 130.

The sensing driving unit 144 may control the data driving circuit 130 and receive, from the data driving circuit 130, degradation amount sensing data obtained by the data driving circuit 130 indicative of the actual amount of degradation of the subpixel SP.

When the degradation amount sensing data is received by the sensing driving unit 144, the correction unit 145 of the controller 140 may calibrate the stress value Vstr stored in the memory 146 based on the degradation amount sensing data.

The stress value Vstr may be increased or decreased by the correction unit 145.

The variation in the stress value Vstr calibrated by the correction unit 145 may be proportional to the difference between the degradation amount sensing data and the pre-stored stress value Vstr.

The variation in the stress value Vstr calibrated by the correction unit 145 may be larger than the increase in the stress value Vstr updated according to the output of the driving data signal.

In other words, the stress value Vstr may gradually increase according to the output of the driving data signal during the period when the real-time compensation is performed, thereby estimating the degradation of the subpixels as they are driven by the data voltages. If the amount of degradation of the subpixel SP is sensed, and the degradation amount sensing data is received, the stress value Vstr may greatly increase or decrease according to the degradation amount sensing data.

Accordingly, according to embodiments of the disclosure, it is possible to compensate for degradation of the subpixel SP using the stress value Vstr based on the driving data signal, in real time. It is also possible to enhance the accuracy of degradation compensation by sensing the amount of degradation of the subpixel SP at a preset time and correcting errors in the stress value Vstr.

The amount of degradation of the subpixel SP may be sensed periodically or aperiodically.

Figure 4:
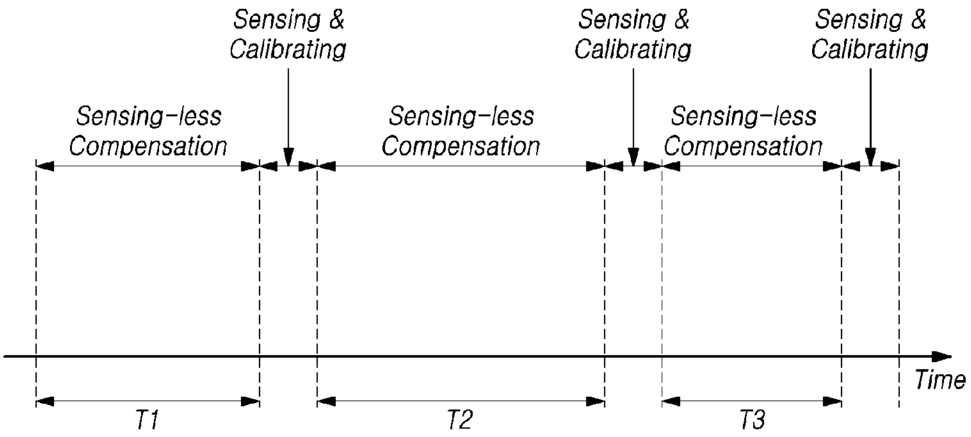
FIG. 4 is a view illustrating an example method in which a display device compensates for degradation of a subpixel according to embodiments of the disclosure.

FIG. 4 is a view illustrating an example method in which a display device 100 compensates for degradation of a subpixel SP according to embodiments of the disclosure.

Referring to FIG. 4, the display device 100 may perform real-time compensation for degradation of the subpixel SP based on the stress value Vstr according to the driving data signal in a period T1. Since compensation is performed without always directly sensing the amount of degradation of the subpixel SP, real-time compensation performed in the period T1 may be referred to as "sensingless compensation".

Real-time compensation for degradation of the subpixel SP may be performed based on the stress value Vstr according to the driving data signal in periods T2 and T3.

Degradation amount sensing for the subpixel SP and calibration of the stress value Vstr according to the degradation amount sensing may be performed between periods T1 and T2 and between periods T2 and T3.

For example, real-time compensation is performed in period T1, and if the stress value Vstr is larger than or equal to a preset value, degradation amount sensing for the subpixel SP may be performed.

If the stress value Vstr is equal to or larger than the preset value, it may be considered that the driving time of the display device 100 has accumulated over a predetermined level. If the driving time is equal to or larger than the predetermined level, the stress value Vstr may have an error due to the driving data signal.

Accordingly, if the stress value Vstr stored in the memory 146 is larger than or equal to the preset value, the display device 100 may sense the amount of degradation of the subpixel SP and calibrate the pre-stored stress value Vstr.

Alternatively, in some cases, if the driving time is equal to or longer than a preset time, the display device 100 may sense the amount of degradation of the subpixel SP and calibrate the stress value Vstr.

After performing degradation amount sensing and stress value (Vstr) calibration between periods T1 and T2, the display device 100 may periodically sense the amount of degradation of the subpixel SP.

Alternatively, the display device 100 may sense the amount of degradation of the subpixel SP if the increase in the stress value Vstr due to display driving in the period T2 is equal to or larger than a predetermined value.

In other words, the display device 100 may periodically or aperiodically sense the amount of degradation of the subpixel SP while performing real-time compensation based on the stress value Vstr.

The display device 100 may sense the amount of degradation of the subpixel SP and calibrate the pre-stored stress value Vstr at a time set based on at least one of an absolute value of the stress value Vstr, a variation in the stress value Vstr, and a driving time of the display device 100.

As such, the display device 100 may compensate for the degradation of the subpixel SP without sensing the amount of degradation of the subpixel SP during the period when real-time compensation is performed. Further, the display device 100 may sense the amount of degradation of the subpixel SP at a preset time and calibrate the pre-stored stress value Vstr.

Figure 5:
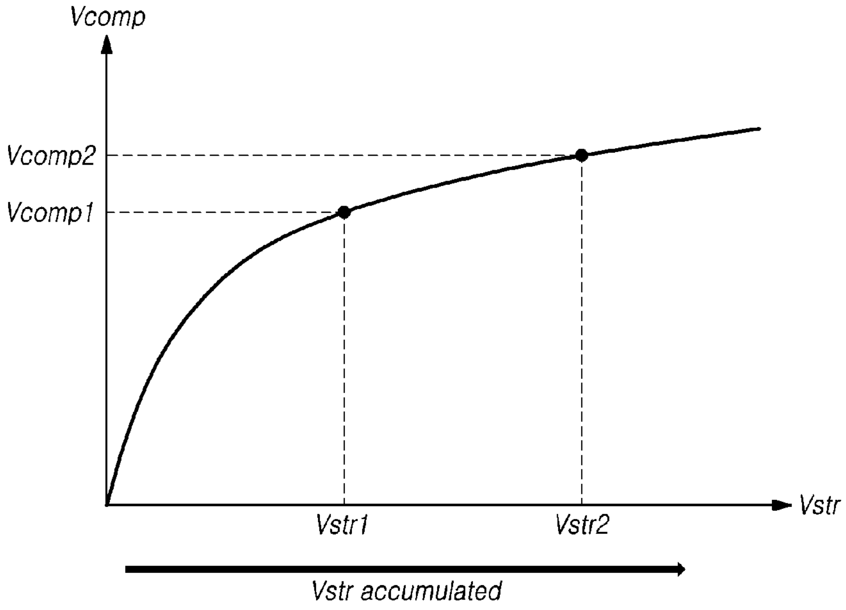
FIG. 5 is a view illustrating an example method in which a display device compensates for degradation of subpixels in real time, according to embodiments of the disclosure.
Figure 6:
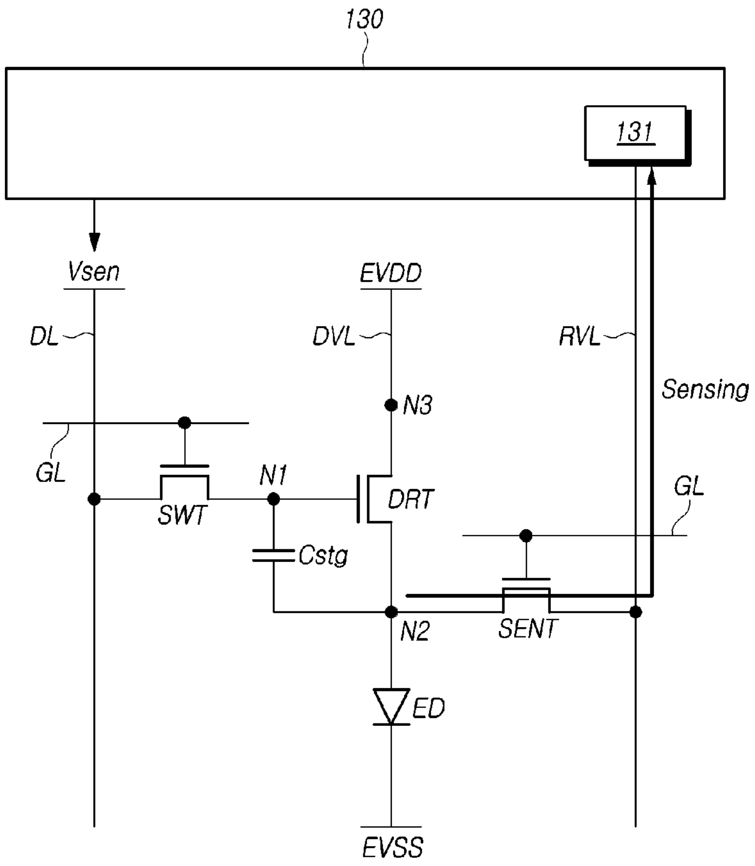
FIG. 6 is a view illustrating an example method in which a display device senses the amount of degradation of a subpixel according to embodiments of the disclosure.

FIG. 5 is a view illustrating an example method in which a display device 100 compensates for degradation of a subpixel SP in real time according to embodiments of the disclosure. FIG. 6 is a view illustrating an example method in which a display device 100 senses the amount of degradation of a subpixel SP according to embodiments of the disclosure.

FIG. 5 illustrates an example of a correspondence between the stress value Vstr and the compensation value Vcomp stored in the memory 146.

If the display device 100 starts driving, the stress value Vstr stored in the memory 146 may increase according to the driving data signal output from the controller 140. Here, the stress value Vstr is increased to indicated estimated degradation of the subpixels driven by the data voltages, without direct sensing of the actual degradation of the subpixels.

When outputting the driving data signal, the controller 140 may output the driving data signal, to which the compensation value Vcomp corresponding to the stored stress value Vstr has been applied, to the data driving circuit 130.

For example, when the accumulated stress value Vstr is a first stress value Vstr1, the controller 140 may output a driving data signal, to which a first compensation value Vcomp1 corresponding to the first stress value Vstr1 has been applied, to the data driving circuit 130.

Thereafter, when the accumulated stress value Vstr becomes a second stress value Vstr2 according to the driving of the display device 100, the controller 140 may output a driving data signal, to which a second compensation value Vcomp2 corresponding to the second stress value Vstr2 has been applied, to the data driving circuit 130.

In other words, the display device 100 may compensate for degradation of the subpixel SP, in real time, based on the correspondence relationship between the stress value Vstr and the compensation value Vcomp illustrated in FIG. 5 and the stress value Vstr updated in real time.

The display device 100 may sense the actual amount of degradation of the subpixel SP at a preset time and calibrate the pre-stored stress value Vstr.

Referring to FIG. 6, the amount of degradation of the subpixel SP may be sensed, e.g., by the data driving circuit 130. The data driving circuit 130 may include a sensing unit 131. The sensing unit 131 may include an analog-to-digital converter, and may sense the amount of degradation of the subpixel SP through the reference voltage line RVL disposed in the subpixel SP.

Alternatively, in some cases, the sensing unit 131 may be a component that is not included in the data driving circuit 130 but is disposed separately from the data driving circuit 130.

The data driving circuit 130 may sense the actual amount of degradation of the subpixel SP during a sensing period. As used herein, the amount of degradation of the subpixel SP may mean the degree to which the threshold voltage or mobility of at least one of the driving transistor DRT and the light emitting element ED has been changed. In the disclosure, an example of sensing the threshold voltage of the driving transistor DRT is described.

For example, the data driving circuit 130 may sense the amount of degradation of the subpixel SP in a blank period of a frame period. Alternatively, the data driving circuit 130 may sense the amount of degradation of the subpixel SP before a predetermined time elapses after the display device 100 is turned on, or the data driving circuit 130 may sense the amount of degradation of the subpixel SP after the display device 100 is turned off.

A turn-on level scan signal may be supplied through the gate line GL during the sensing period. While the switching transistor SWT and the sensing transistor SENT are on, the data driving circuit 130 may supply a sensing data voltage Vsen through the data line DL to sense the amount of degradation of the subpixel SP. The reference voltage Vref may be supplied through the reference voltage line RVL.

Thereafter, a turn-off level scan signal may be supplied through the gate line GL. Since the switching transistor SWT and the sensing transistor SENT are turned off, the first node N1 and the second node N2 may float. The second node N2 may be coupled with the first node N1 so that the voltage of the second node N2 may increase.

When a predetermined time elapses, the voltage of the second node N2 may be saturated. When the second node N2 is saturated, the sensing transistor SENT is turned on, and the voltage of the second node N2 may be sensed through the reference voltage line RVL.

The threshold voltage of the driving transistor DRT may be sensed using a difference between the voltage of the second node N2 and the sensing data voltage Vsen.

The data driving circuit 130 may transmit data of the sensed threshold voltage of the driving transistor DRT to the controller 140. The controller 140 may calibrate the stress value Vstr stored in the memory 146 based on the degradation amount sensing data received from the data driving circuit 130.

The controller 140 may calculate a compensation value Vcomp according to the degradation amount sensing data obtained by sensing the amount of degradation of the subpixel SP and identify a stress value Vstr corresponding to the calculated compensation value Vcomp. The controller 140 may correct the error in the stress value Vstr by calibrating the pre-stored stress value Vstr to the identified stress value Vstr.

After correcting the error in the stress value Vstr and storing the corrected stress value Vstr, the controller 140 may perform real-time compensation while increasing the corrected stress value Vstr according to the driving of the display.

Figure 7:
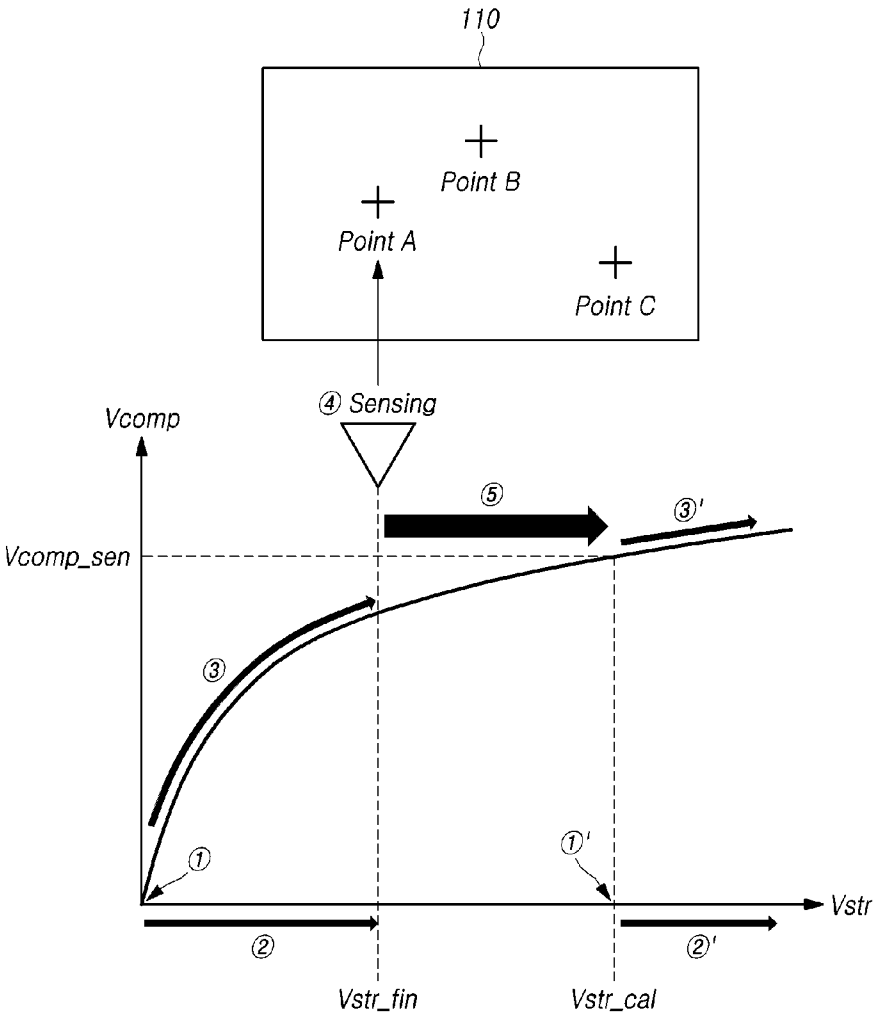
FIGS. 7, 8, and 9 are views illustrating a specific example of a method in which a display device compensates for degradation of a subpixel according to embodiments of the disclosure.
Figure 8:
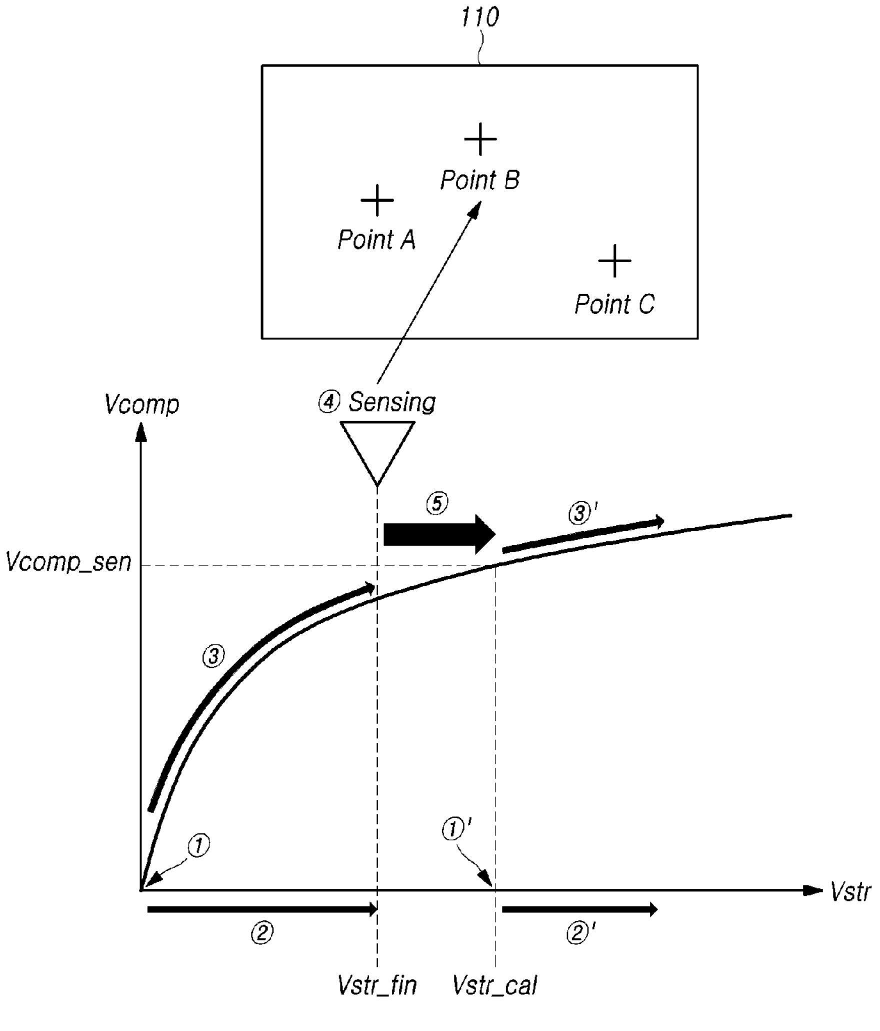
Figure 9:
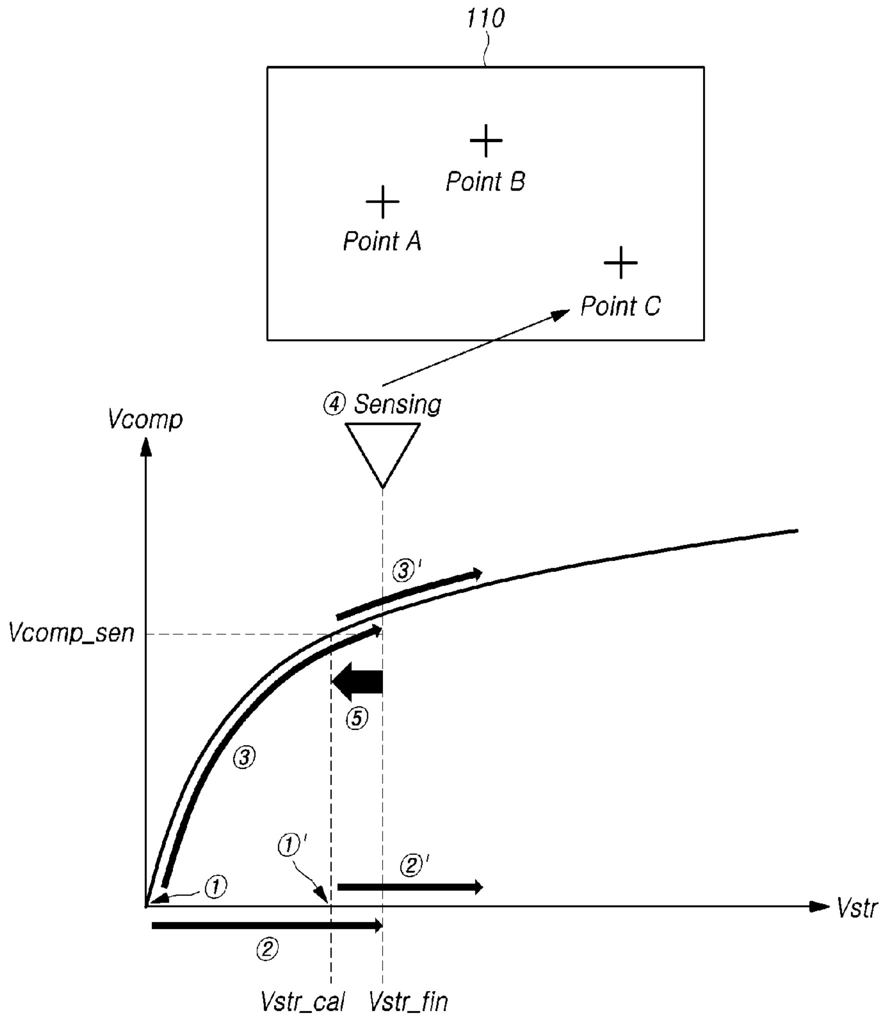

FIGS. 7 to 9 are views illustrating a specific example of a method in which a display device 100 compensates for degradation of a subpixel SP according to embodiments of the disclosure. FIGS. 7 to 9 illustrate examples of a method in which the display device 100 corrects the stress value Vstr while performing real-time compensation and then performs real-time compensation again.

Referring to FIGS. 7 to 9, if the display device 100 starts driving, the controller 140 of the display device 100 fetches the stress value Vstr pre-stored in the memory (①) and output a driving data signal, to which the compensation value Vcomp corresponding to the fetched stress value Vstr has been applied. Accordingly, compensation for degradation of the subpixel SP may be performed based on the pre-stored stress value Vstr.

If the driving time of the display device 100 is accumulated, the controller 140 may increase the stress value Vstr according to the driving time of the display device 100 to indicate estimated degradation of the subpixels driven by the driving voltages and store it in the memory 146 (②). In other words, the controller 140 may increase the stress value Vstr according to the driving data signal output to the data driving circuit 130 to estimate further degradation of the subpixels as they are driven by the data voltages.

The controller 140 may compensate for the degradation of the subpixel SP, which occurs according to the driving of the display device 100, in real time, by applying the compensation value Vcomp corresponding to the increased stress value Vstr when outputting the driving data signal (③).

The controller 140 may drive the sensing of the amount of degradation of the subpixel SP at a preset time (③).

The preset time may be a time when the stress value Vstr stored in the memory 146 becomes a preset value or more according to the driving of the display device 100. Alternatively, the preset time may be a time at which an increased amount of the stress value Vstr after the last sensing of the amount of degradation of the subpixel SP is equal to or larger than a preset value. Alternatively, the preset time may be a time periodically set according to the driving time of the display device 100.

A period during which the controller 140 senses the amount of degradation of the subpixel SP may be a blank period among the frame period. Alternatively, the period may be before a predetermined period elapses after the display device 100 has been turned on or off.

The controller 140 may drive the sensing of the amount of degradation of the subpixel SP. For example, the controller 140 may sense the actual amount of degradation of the subpixel SP through the data driving circuit 130.

Upon receiving the degradation amount sensing data obtained according to the sensing of the actual amount of degradation of the subpixel SP, the controller 140 may calculate a sensing compensation value Vcomp_sen required due to actual degradation of the subpixel SP based on the degradation amount sensing data. The controller 140 may calibrate the pre-stored final stress value Vstr_fin to the corrected stress value Vstr_cal based on the calculated sensing compensation value Vcomp_sen (⑤).

The controller 140 may correct an error in the stress value Vstr by calibrating the stress value Vstr based on the degradation amount sensing data.

Here, the controller 140 may initialize the stored compensation value Vcomp, corresponding to the pre-stored final stress value Vstr_fin, to the corrected stress value Vstr_cal based on the calculated sensing compensation value Vcomp_sen.

In other words, the error in the stress value Vstr is corrected, the compensation value Vcomp corresponding to the stress value Vstr is initialized, and compensation may be newly performed based on the calibrated stress value Vstr_cal.

If driving of the display device 100 restarts, the controller 140 fetches the calibrated corrected stress value Vstr_cal (①'). As the display device 100 is driven, the controller 140 increases the stress value Vstr from the fetched corrected stress value Vstr_cal (②') to estimate additional degradation of the subpixels driven by the driving voltages.

The controller 140 may compensate for the degradation of the subpixel SP by applying the compensation value Vcomp corresponding to the stress value Vstr increasing again from the corrected stress value Vstr_cal (③').

Accordingly, the controller 140 may perform real-time compensation based on the error-corrected stress value Vstr until the amount of actual degradation of the subpixel SP is sensed again.

Errors in the stress value Vstr may differ for each subpixel SP disposed in the display panel 110. Accordingly, the correction amount according to the error in the stress value Vstr may be different for each subpixel SP.

FIG. 7 illustrates an example of correcting an error in the stress value Vstr of the subpixel SP positioned at point A of the display panel 110.

The controller 140 may calibrate the final stress value Vstr_fin pre-stored in the memory 146 to the corrected stress value Vstr_cal based on the sensing compensation value Vcomp_sen calculated from the sensed amount of degradation of the subpixel SP. Since the error in the stress value Vstr stored in the memory 146 is corrected, the stress value Vstr may significantly vary.

FIG. 8 illustrates another example of correcting an error in the stress value Vstr of the subpixel SP positioned at point A of the display panel 110.

The controller 140 may sense the amount of degradation of the subpixel SP and may calibrate the pre-stored final stress value Vstr_fin to the corrected stress value Vstr_cal based on the sensing compensation value Vcomp_sen. The correction amount of the stress value Vstr of the subpixel SP positioned at point B may be smaller than the correction amount of the stress value Vstr of the subpixel SP positioned at point A.

Since the degree of degradation differs for each area of the display panel 110, the error in the accumulated stress value Vstr according to the driving data signal may also differ. Accordingly, the correction amount of the stress value Vstr may differ at the subpixels SP between points A and B.

As another example, referring to FIG. 9, the final stress value Vstr_fin stored in the memory 146 may be calibrated to the corrected stress value Vstr_cal according to the correction of the stress value Vstr by the controller 140, and the stress value Vstr may be decreased.

FIG. 9 illustrates an example of correcting an error in the stress value Vstr of the subpixel SP positioned at point C of the display panel 110.

The sensing compensation value Vcomp_sen calculated by the controller 140 based on the degradation amount sensing data may be smaller than the compensation value Vcomp corresponding to the final stress value Vstr_fin.

The controller 140 may calibrate the final stress value Vstr_fin stored in the memory 146 to a corrected stress value Vstr_cal smaller than the final stress value Vstr_fin.

The controller 140 may perform real-time compensation while increasing the stress value Vstr from the corrected stress value Vstr_cal reduced according to the driving of the display device 100.

As described above, the display device 100 according to embodiments of the disclosure may perform real-time compensation for degradation of the subpixel SP using the stress value Vstr accumulated according to driving of the display.

It is also possible to perform high-accuracy, real-time compensation while minimizing sensing by correcting the error in the stress value Vstr based on the sensing of the amount of degradation of the subpixel SP performed at a preset time.

Figure 10:
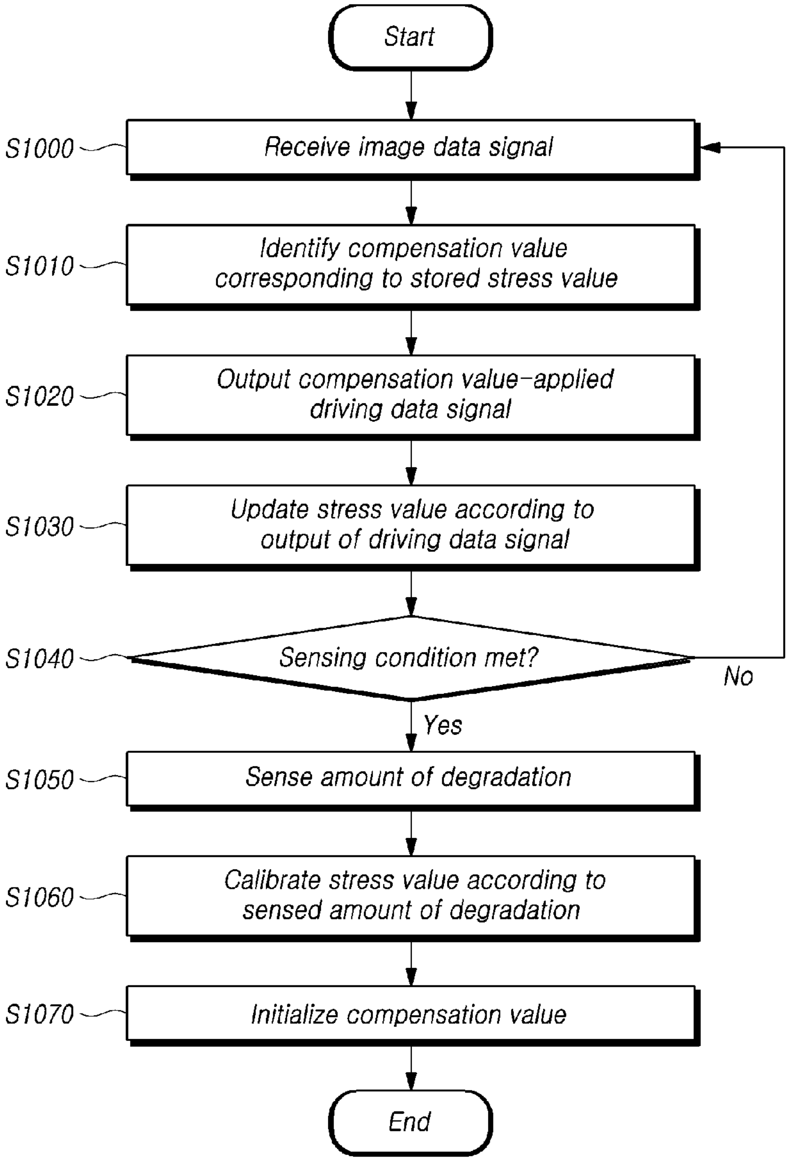
FIGS. 10 and 11 illustrate a process in which a display device compensates for degradation of a subpixel according to embodiments of the disclosure.
Figure 11:
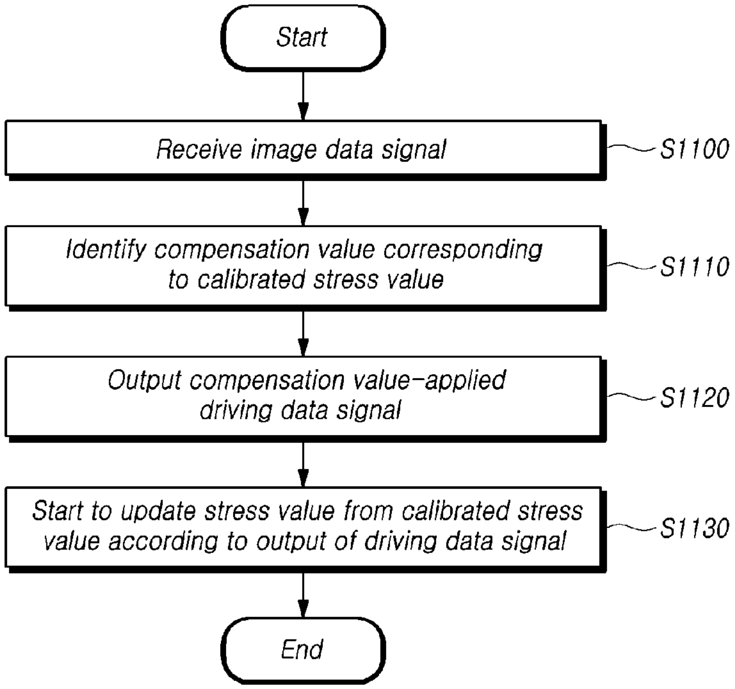

FIGS. 10 and 11 are views illustrating a process in which a display device 100 compensates for degradation of a subpixel SP according to embodiments of the disclosure.

FIG. 10 illustrates an example process in which the controller 140 senses the amount of degradation of the subpixel SP during real-time compensation and corrects the stress value Vstr. FIG. 11 illustrates an example process of performing real-time compensation again after the stress value Vstr is corrected.

Referring to FIG. 10, the controller 140 receives an image data signal from the outside (S1000) and identifies the stress value Vstr stored in the memory 146 and the compensation value Vcomp corresponding to the stress value Vstr (S1010).

The controller 140 outputs a driving data signal, to which the compensation value Vcomp has been applied, to the data driving circuit 130 (S1020).

The controller 140 updates the stress value Vstr stored in the memory 146 as the driving data signal is output (S1030). In other words, since the compensation value Vcomp is applied to the data voltage Vdata supplied to the subpixel SP, the stress value Vstr is updated based on the compensation value (Vcomp)-reflected driving data signal to estimate degradation of the subpixels driven by the compensation value (Vcomp)-reflected driving data signal.

The controller 140 compensates for the degradation of the subpixel SP in real time as in the above-described process, and identifies whether a condition for sensing the amount of actual degradation of the subpixel SP is met (S1040).

For example, it may be determined that the sensing condition is met when the stress value Vstr or the driving time of the display device 100 is equal to or larger than a preset value or when an amount of increase in the stress value Vstr after the last degradation sensing or the driving time of the display device 100 is equal to or larger than a predetermined value.

The controller 140 controls the data driving circuit 130 and senses the actual amount of degradation of the subpixel SP (S1050).

The controller 140 calibrates the pre-stored stress value Vstr based on the degradation amount sensing data (S1060). The stress value Vstr stored in the memory 146 may be significantly increased or decreased by calibrating the stress value Vstr.

The controller 140 may initialize the compensation value Vcomp previously stored in the memory 146 (S1070).

Referring to FIG. 11, the controller 140 corrects the stress value Vstr and then receives the image data signal (S1100).

The controller 140 identifies the compensation value Vcomp corresponding to the stress value Vstr calibrated after sensing the amount of degradation (S1110) and outputs a driving data signal, to which the identified compensation value Vcomp has been applied (S1120). Accordingly, it is possible to perform compensation based on the error-corrected stress value Vstr.

The controller 140 updates the stress value Vstr from the stress value Vstr calibrated according to the output of the driving data signal (S1130). Accordingly, real-time compensation may be performed again in a state in which the error in the stress value Vstr has been corrected.

According to the above-described embodiments of the disclosure, it is possible to compensate for the degradation of the subpixel SP, in real time, without sensing the degradation of the subpixel SP by increasing the stress value Vstr according to the driving of the display device 100 and performing compensation for degradation based on the stress value Vstr.

Further, as the amount of degradation of the subpixel SP is sensed at a preset time, and the stress value Vstr is corrected based on the degradation amount sensing data, real-time compensation for degradation of the subpixel SP may be performed at high accuracy.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A display device comprising:

a plurality of subpixels;

a data driving circuit providing data voltages to the plurality of subpixels; and a controller outputting driving data signals to the data driving circuit, wherein:

during a first period, the controller causes the data driving circuit to drive a first subpixel with a first data voltage that is compensated with a first compensation value corresponding to a first stress value, wherein the first compensation value is obtained from a lookup table indicating a correspondence between stress values and compensation values, wherein the lookup table is stored in a memory, that is indicative of an estimated degradation of the first subpixel, the first stress value adjusted based on a first initial stress value and the data voltages driving the first subpixel;

during a second period subsequent to the first period, the controller receives from the data driving circuit first degradation amount sensing data indicative of sensed actual degradation of the first subpixel and calibrates the first stress value with a second initial stress value according to the first degradation amount sensing data of the first subpixel to a second stress value, responsive to a comparison indicating that a magnitude of an amount of increase of the first stress value of the first subpixel from the first initial stress value of the first subpixel is equal to or greater than a predetermined value;

during a third period subsequent to the second period, the controller causes the data driving circuit to drive the first subpixel with a second data voltage that is compensated with a second compensation value corresponding to a second stress value, wherein the second compensation value obtained from the lookup table according to the second stress value indicative of estimated degradation of the first subpixel from when the second initial stress value was sensed during the second period, wherein the second stress value adjusted based on the second initial stress value and the data voltages driving the first subpixel, and wherein the second initial stress value is indicative of actual degradation of the first subpixel that is sensed during the second period rather than estimated, wherein the controller initializes the compensation values stored in the memory after the second period, and wherein the first stress value and the second stress value increase during the first period and the third period, respectively, as the first subpixel is driven by the data voltages.

2. The display device of claim 1, wherein actual degradation of the first subpixel is not sensed during the first period and the third period.

3. The display device of claim 1, wherein actual degradation of the first subpixel is sensed, responsive to the first subpixel being driven equal to or longer than a predetermined driving time.

4. The display device of claim 1, wherein actual degradation of the first subpixel is sensed, at periodic intervals.

5. The display device of claim 1, wherein the second initial stress value is greater than the first stress value.

6. The display device of claim 1, wherein the second initial stress value that replaces the first stress value is a first magnitude that is less than a magnitude of the first stress value responsive to the sensed actual degradation of the first subpixel being less than the estimated degradation of the first subpixel during the first period and the second initial stress value that replaces the first stress value is a second magnitude that is greater than the magnitude of the first stress value responsive to the sensed actual degradation of the first subpixel being greater than the estimated degradation of the first subpixel during the first period.

7. The display device of claim 1, wherein:

during the first period, the controller causes the data driving circuit to drive a second subpixel with a third data voltage that is compensated according to a third stress value indicative of estimated degradation of the second subpixel, the third stress value adjusted based on a third initial stress value and the data voltages driving the second subpixel;

during the second period, the controller receives from the data driving circuit second degradation amount sensing data indicative of sensed actual degradation of the second subpixel and initializes the third stress value to a fourth initial stress value according to the second degradation amount sensing data of the second subpixel, the fourth initial stress value being different from the second initial stress value; and during the third period, the controller causes the data driving circuit to drive the second subpixel with a fourth data voltage that is compensated according to a fourth stress value indicative of estimated degradation of the second subpixel, the fourth stress value adjusted based on the fourth initial stress value and the data voltages driving the second subpixel.

8. The display device of claim 1, wherein the first stress value, the first compensation value corresponding to the first stress value, the second stress value, the second compensation value corresponding to the second stress value are stored in the memory.

9. The display device of claim 1, wherein degradation of the first subpixel includes degradation of at least one of a light emitting element and a driving transistor included in the first subpixel.

10. A method of driving a display device including a plurality of subpixels, the method comprising:

during a first period, driving a first subpixel with a first data voltage that is compensated with a first compensation value corresponding to a first stress value, wherein the first compensation value obtained from a lookup table indicating a correspondence between stress values and compensation values is stored in memory, that is indicative of estimated degradation of the first subpixel, the first stress value adjusted based on a first initial stress value and data voltages driving the first subpixel;

determining a magnitude of an amount of increase of the first stress value of the first subpixel from the first initial stress value of the first subpixel based on a difference between the first stress value of the first subpixel and the first initial stress value of the first subpixel;

comparing the magnitude to a predetermined value;

during a second period subsequent to the first period, sensing actual degradation of the first subpixel and calibrating the first stress value with a second initial stress value according to the sensed actual degradation of the first subpixel to a second stress value, responsive to the comparison indicating that the magnitude of the amount of increase of the first stress value of the first subpixel from the first initial stress value of the first subpixel is equal to or greater than the predetermined value;

during a third period subsequent to the second period, driving the first subpixel with a second data voltage that is compensated with a second compensation value corresponding to a second stress value, wherein the second compensation value obtained from the lookup table according to the second stress value, indicative of an estimated degradation of the first subpixel from when the second initial stress value was sensed during the second period, wherein the second stress value adjusted based on the second initial stress value and the data voltages driving the first subpixel, and wherein the second initial stress value is indicative of the actual degradation of the first subpixel that is sensed during the second period rather than estimated, wherein the compensation values of the lookup table stored in the memory is initialized after the second period, and wherein the first stress value and the second stress value increase during the first period and the third period, respectively, as the first subpixel is driven by the data voltages.

11. The method of claim 10, wherein the first stress value and the second stress value increase during the first period and the third period, respectively, as the first subpixel is driven by the data voltages.

12. The method of claim 10, wherein actual degradation of the first subpixel is not sensed during the first period and the third period.

13. The method of claim 10, further comprising:

during the first period, driving a second subpixel with a third data voltage that is compensated according to a third stress value indicative of estimated degradation of the second subpixel, the third stress value adjusted based on a third initial stress value and data voltages driving the second subpixel;

during the second period, sensing actual degradation of the second subpixel and initializing the third stress value to a fourth initial stress value according to the sensed actual degradation of the second subpixel, the fourth initial stress value being different from the second initial stress value; and during the third period, driving the second subpixel with a fourth data voltage that is compensated according to a fourth stress value indicative of estimated degradation of the second subpixel, the fourth stress value adjusted based on the fourth initial stress value and the data voltages driving the second subpixel.

14. A display device, comprising:

a plurality of subpixels;

a data driving circuit supplying a data voltage to the plurality of subpixels;

a controller outputting a driving data signal to the data driving circuit; and a memory storing a first stress value indicating an estimated amount of degradation of a first subpixel from the plurality of subpixels and a lookup table indicating a correspondence between stress values and compensation values, wherein the first stress value stored in the memory is increased from an initial stress value while the controller outputs the driving data signal, and the controller determines a magnitude of an amount of increase of the first stress value of the first subpixel from the initial stress value of the first subpixel based on a difference between the first stress value of the first subpixel and the first initial stress value of the first subpixel and compares the magnitude to a predetermined value, and the first stress value stored in the memory is calibrated to a second stress value that is based on a sensed amount of degradation of the first subpixel responsive to the amount of increase of the first stress value of the first subpixel from the first initial stress value of the first subpixel is equal to or greater than the predetermined value, wherein the second stress value that is indicative of the sensed amount of degradation of the first subpixel is sensed, wherein the controller initializes the compensation value of the lookup table stored in the memory after the first stress value is calibrated to the second stress value, wherein the data voltage is compensated with a second compensation value corresponding to the second stress value, wherein the second compensation value obtained from the lookup table according to the second stress value adjusted based the second initial stress value, and wherein the first stress value and the second stress value increase, respectively, as the first subpixel is driven by the data voltage.

15. The display device of claim 14, wherein a variation in the second stress value stored in the memory after sensing the amount of degradation of the first subpixel is larger than an increase in the first stress value stored in the memory while the controller outputs the driving data signal.

16. A display device, comprising:

a plurality of subpixels;

a data driving circuit supplying a data voltage to the plurality of subpixels;

a controller outputting a driving data signal to the data driving circuit and receiving degradation amount sensing data of a subpixel from the plurality of subpixels from the data driving circuit at a preset time; and a memory storing a first stress value of the subpixel and a lookup table indicating a correspondence between stress values and compensation values, wherein the first stress value is increased from an initial stress value of the subpixel and replaces the initial stress value of the subpixel if the controller outputs the driving data signal, and the first stress value of the subpixel is calibrated to a second stress value of the subpixel based on the degradation amount sensing data if the controller receives the degradation amount sensing data, wherein the controller determines a magnitude of an amount of increase of the first stress value of the subpixel from the first initial stress value of the subpixel based on a difference between the first stress value of the first subpixel and the first initial stress value of the first subpixel and compares the magnitude to a predetermined value, and the degradation amount sensing data of the subpixel is sensed and the first stress value of the subpixel is calibrated to the second stress value, responsive to the comparison indicating that the magnitude of the increase of the first stress value of the subpixel from the first initial stress value of the subpixel is equal to or greater than the predetermined value, wherein the controller initializes the compensation values of the lookup table stored in the memory after the first stress value is calibrated to the second stress value, wherein the data voltage is compensated with a second compensation value corresponding to the second stress value, wherein the second compensation value obtained from the lookup table according to the second stress value adjusted based the second initial stress value, and wherein the first stress value and the second stress value increase, respectively, as the first subpixel is driven by the data voltage.

17. The display device of claim 1, wherein the first initial stress value is greater than zero.

* * * * *